(12) United States Patent
Morren et al.

(10) Patent No.: US 8,720,841 B2
(45) Date of Patent: May 13, 2014

(54) CLAMP ASSEMBLY

(76) Inventors: Michael Morren, Zeeland, MI (US);
James Knott, Holland, MI (US);
Donald Morren, Zeeland, MI (US);
James Morren, Zeeland, MI (US)

(*) Notice: Subject to any disclaimer, the term of this patent is extended or adjusted under 35 U.S.C. 154(b) by 336 days.

(21) Appl. No.: 12/901,812

(22) Filed: Oct. 11, 2010

(65) Prior Publication Data
US 2011/0101190 A1 May 5, 2011

Related U.S. Application Data

(60) Provisional application No. 61/250,327, filed on Oct. 9, 2009.

(51) Int. Cl.
*A47G 1/10* (2006.01)
(52) U.S. Cl.
USPC .............. 248/316.5; 248/316.1; 248/689; 248/229.2; 248/229.23
(58) Field of Classification Search
USPC ............. 248/316.5, 229.23, 229.13, 230.4, 248/231.51, 316.1, 229, 23, 689, 686, 691, 248/229.1, 229.2, 309.1, 313; 24/455, 457, 24/485, 489, 499, 506; 211/62, 63, 69.8, 211/69.9, 70.6; 269/8, 37, 47, 48.4, 86, 87, 269/152, 157
See application file for complete search history.

(56) References Cited

U.S. PATENT DOCUMENTS

| | | | | |
|---|---|---|---|---|
| 286,113 A * | 10/1883 | Burk | .......................... | 248/316.5 |
| 4,660,870 A | 4/1987 | Donley | | |
| 4,826,215 A | 5/1989 | Sullivan | | |
| 4,893,801 A | 1/1990 | Flinn | | |
| 5,354,030 A * | 10/1994 | Harwood | ................... | 248/316.1 |
| 5,423,831 A | 6/1995 | Nates | | |
| 7,229,055 B2 * | 6/2007 | Wallther | ...................... | 248/211 |
| 7,490,797 B1 * | 2/2009 | Law | .......................... | 248/163.2 |
| 7,490,802 B1 * | 2/2009 | Teng | ........................ | 248/229.15 |
| 7,698,847 B2 * | 4/2010 | Griffin | ........................ | 42/71.01 |
| 8,136,774 B2 * | 3/2012 | Melittas | ....................... | 248/210 |
| 8,354,030 B1 * | 1/2013 | Schuh | ...................... | 210/748.01 |

* cited by examiner

*Primary Examiner* — Todd M Epps
(74) *Attorney, Agent, or Firm* — King & Partners, PLC

(57) ABSTRACT

A clamp assembly including a base member, wherein the base member includes a top surface and a bottom surface, and wherein at least one of the top and bottom surfaces is adapted for fixed or releasable association with a substrate; a first support arm, wherein the first support arm includes an inner surface and an outer surface, and wherein the first support arm is displaceable along a first axis, a second support arm, wherein the second support arm includes an inner surface and an outer surface, and wherein the second support arm is displaceable along the first axis, and wherein the first and second support arms are biased such that the inner surfaces of the support members contact each other at a first contact point.

9 Claims, 4 Drawing Sheets

CLAMP ASSEMBLY

CROSS-REFERENCE TO RELATED APPLICATION(S)

This application claims the benefit of U.S. Provisional Application Ser. No. 61/250,327, filed Oct. 9, 2009, entitled "CLAMP ASSEMBLY," which is hereby incorporated herein by reference in its entirety, including all references cited therein.

BACKGROUND OF THE INVENTION

1. Field of the Invention

The present invention relates in general to a clamp assembly and, more particularly, to a bi-arm clamp assembly which is mountable to a plurality of substrates.

2. Background Art

Clamp assemblies for use in numerous applications have been known in the art for years, and are the subject of a plurality of patents including, for example: U.S. Pat. No. 4,660,870 entitled "Clamp," U.S. Pat. No. 4,826,215 entitled "Clamp," U.S. Pat. No. 4,893,801 entitled "Clamp," and U.S. Pat. No. 5,423,831 entitled "Clamp,"—all of which are hereby incorporated herein by reference in their entirety including the references cited therein.

U.S. Pat. No. 4,660,870 appears to disclose a band that is discontinuous circumferentially and placeable on an object to be clamped in transverse direction. Toggle locking means releasably lock the ends of the band together on the object. In one form the band is made in parts hinged together, and in another, it is a single piece of flexible material. The clamp, in another form includes an inner band forming a sealing gasket. In still another form, a repair band is included, which is applied to the object, and when the clamp is removed, the repair band remains as a unitary repair component on the object.

U.S. Pat. No. 4,826,215 appears to disclose a clamp for securing a hose connection. The clamp is a cylindrical shell which encases a hose connection and secures the connection from being disconnected by ordinary means.

U.S. Pat. No. 4,893,801 appears to disclose a hand-held clamp which is operable by one hand. The clamp includes a stationary jaw and a movable jaw carried on elongated support arms. A pressure arm is attached to the movable jaw and is advanced by a ratchet mechanism operated by the hand holding the clamp.

U.S. Pat. No. 5,423,831 appears to disclose a clamp which has a pair of arms having their inner ends joined by a hinge and their outer ends connected by a locking device. The device comprises one member having a body with a transverse groove therein and a second member comprising a tongue with a hook which engages in the groove. The first mentioned member further comprises a cross-bar spaced away from and above the groove and the tongue is capable of being inserted between the cross-bar and the body. The tongue also has a projection to engage the cross-bar when the hook engages in the groove.

While the above-identified patents do appear to provide clamps for numerous different applications, their configurations remain non-desirous and/or problematic inasmuch as, among other things, none of the above-identified clamp assemblies appear to be configured to effectively mount to a plurality of substrates, including, for example, a generally vertical and/or horizontal wall of a building, vehicle, boat, etcetera.

It is therefore an object of the present invention to provide a clamp assembly as is disclosed herein, which, among other things, remedies the aforementioned detriments and/or complications associated with the use of the above-identified, conventional clamp assemblies. It is further therefore an object of the present invention to provide a clamp assembly which, among other things, comprises displaceable bi-arms which are biased inwardly into a closed position, wherein the clamp assembly includes a base member which is configured to mount to a plurality of substrates. Such a clamp is adapted to releasably secure guns, fishing rods, lawn/garden equipment, bottles, containers—just to name a few.

These and other objects of the present invention will become apparent in light of the present specification, claims, and drawings.

SUMMARY OF THE INVENTION

In one embodiment, the present invention is directed to a clamp assembly, comprising: (a) a base member, wherein the base member comprises a top surface and a bottom surface, and wherein at least one of the top and bottom surfaces is adapted for fixed or releasable association with a substrate; (b) a first support arm, wherein the first support arm comprises an inner surface and an outer surface, and wherein the first support arm is displaceable along a first axis; (c) a second support arm, wherein the second support arm comprises an inner surface and an outer surface, and wherein the second support arm is displaceable along the first axis; and (d) wherein the first and second support arms are biased such that the inner surfaces of the support members contact each other at a first contact point.

In an additional embodiment, the first and second support arms each include a first notch and a second notch.

In another embodiment, the second notch is substantially arcuate in shape and has a radius larger than the radius of the first notch which is also substantially arcuate in shape.

In yet another embodiment, the clamp assembly further comprises two sidewalls extending perpendicularly from the top surface of the base, the sidewalls spaced apart from one another to define a slot that is sized to receive at least a portion of each of the first and second support arms therein.

In one embodiment, each of the first and second support arms are pivotally connected to the sidewalls.

In an additional embodiment, the clamp assembly further comprises a compression spring associated with each of the first and second support arms for biasing the first and second support arms inwardly towards one another.

In a further embodiment, the compression springs are disposed at least partially within the slot.

According to additional embodiments, the clamp assembly further comprises a plurality of cavities disposed along the bottom surface of the base member for receiving an adhesive product.

In additional embodiments, each of the cavities are defined by a continuous sidewall.

In one embodiment, the present invention is directed to a clamp assembly that includes: (a) a base member, wherein the base member comprises a top surface and a bottom surface, and wherein at least one of the top and bottom surfaces is adapted for fixed or releasable association with a substrate and at least one continuous sidewall extending from the bottom surface to define a cavity for receiving an adhesive product; (b) a first support arm, wherein the first support arm comprises an inner surface and an outer surface, and wherein the first support arm is pivotally connected to the base member; (c) a second support arm, wherein the second support arm comprises an inner surface and an outer surface, and wherein the second support arm is pivotally connected to the base member; and (d) wherein the first and second support arms are biased together such that the inner surfaces of the support members contact each other at a first contact point.

BRIEF DESCRIPTION OF THE DRAWINGS

Certain embodiments of the present invention are illustrated by the accompanying figures. It will be understood that the figures are not necessarily to scale and that details not necessary for an understanding of the invention or that render other details difficult to perceive may be omitted. It will be further understood that the invention is not necessarily limited to the particular embodiments illustrated herein.

The invention will now be described with reference to the drawings wherein.

DETAILED DESCRIPTION OF THE INVENTION

Figure 1:
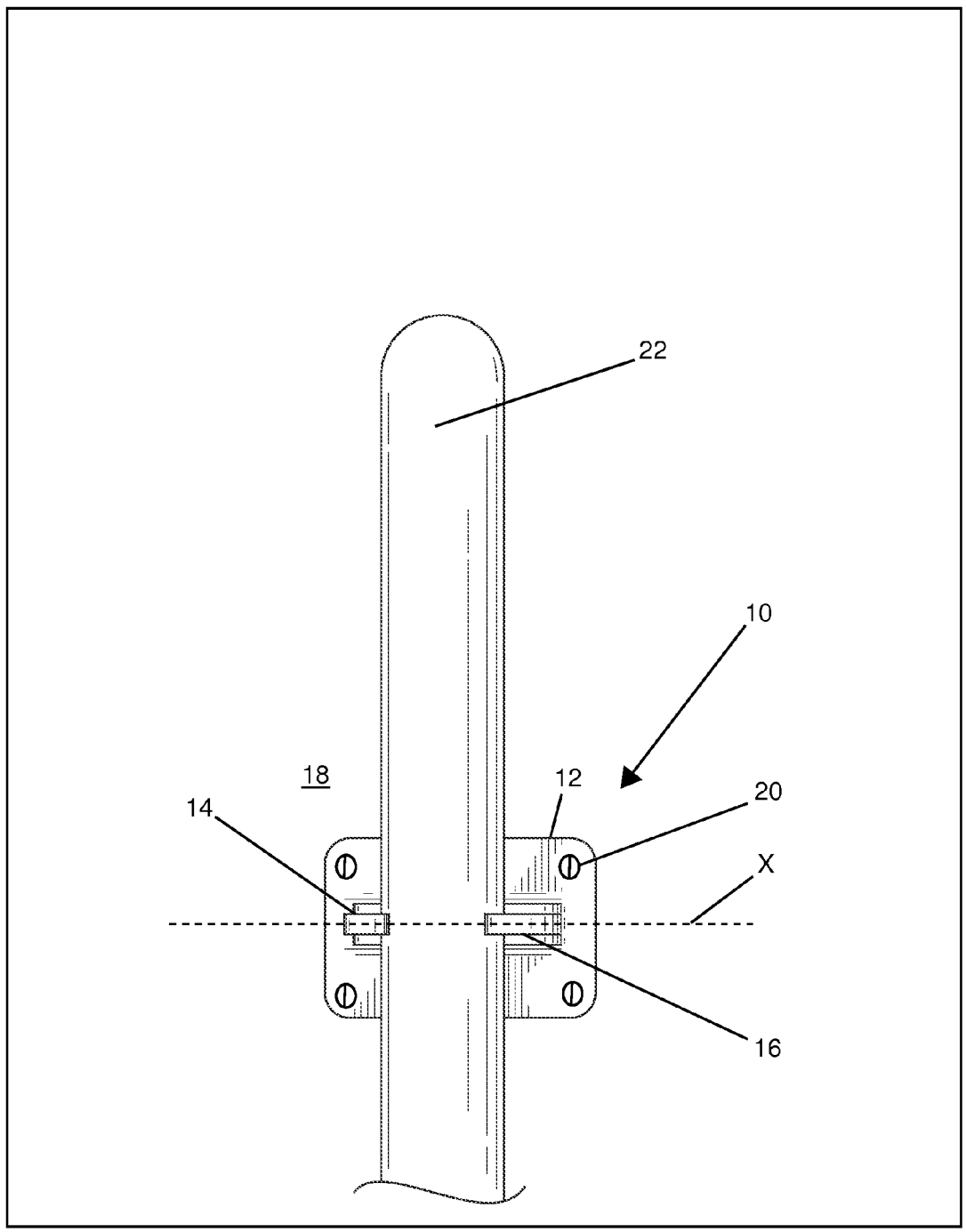
FIG. 1 of the drawings is a perspective view of a clamp assembly operatively connected to a substrate, the clamp assembly constructed in accordance with the present invention.

While this invention is susceptible of embodiment in many different forms, there is shown in the drawings and described herein in detail several specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings with like reference characters.

Referring now to the collective drawings, and to FIG. 1 in particular, a perspective view of a first embodiment of clamp assembly 10 is shown which generally comprises base member 12, first support member (e.g., arm) 14, and second support member (e.g., arm) 16. Clamp assembly 10 may be operatively connected to substrate 18 via one or more fasteners 20 extending through base member 12 and into substrate 18. Additionally, clamp assembly 10 is adapted to receive and hold at least a portion of an object, such as handle 22 of a broom.

Base member 12 may be fabricated from any one of a number of resilient materials such as a metal, an alloy, a polymer, a resin, a natural product such as wood, a composite, or any combination thereof. Base member 12 may be fabricated as a substantially rectangular member having a predetermined thickness, although it will be understood that base member 12 comprises any one of a number of different sizes and shapes that vary according to design requirements.

Figure 2:
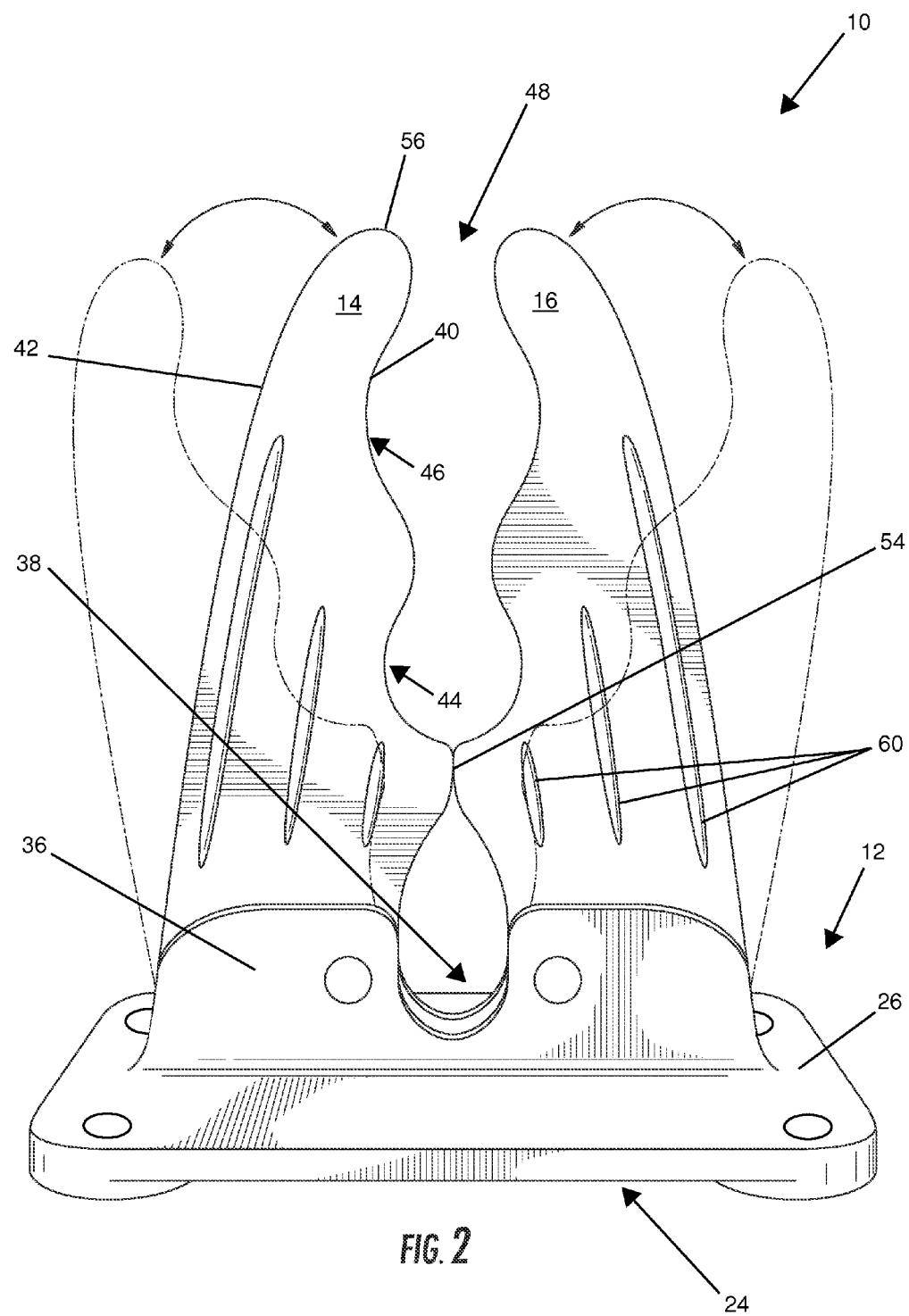
FIG. 2 of the drawings is a perspective view of the clamp assembly illustrating the pivotal movement of the support arms of the clamp assembly.
Figure 3:
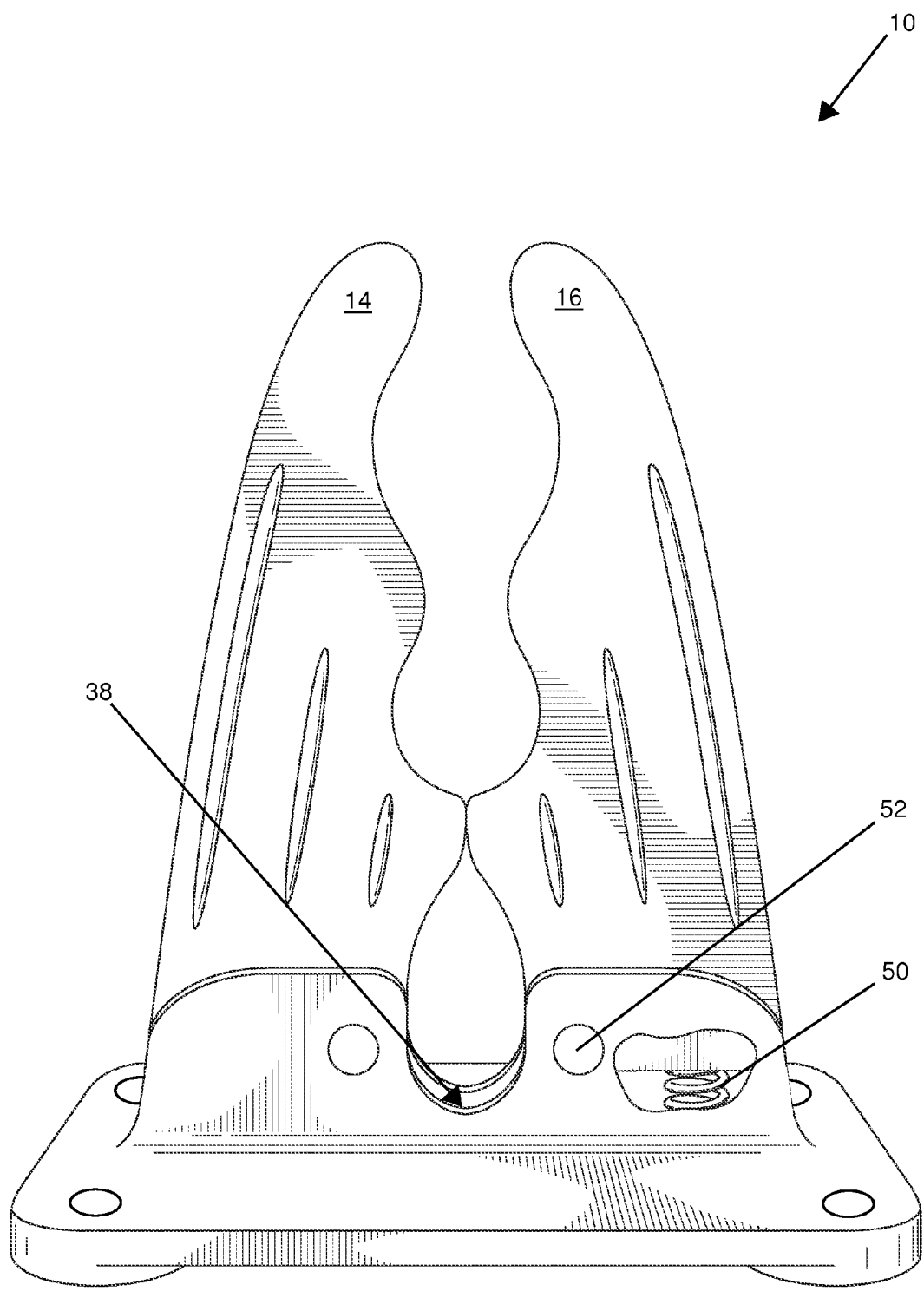
FIG. 3 of the drawings is a perspective view of a clamp assembly having a partial cutaway revealing a compression spring disposed within a slot of a base member.
Figure 4:
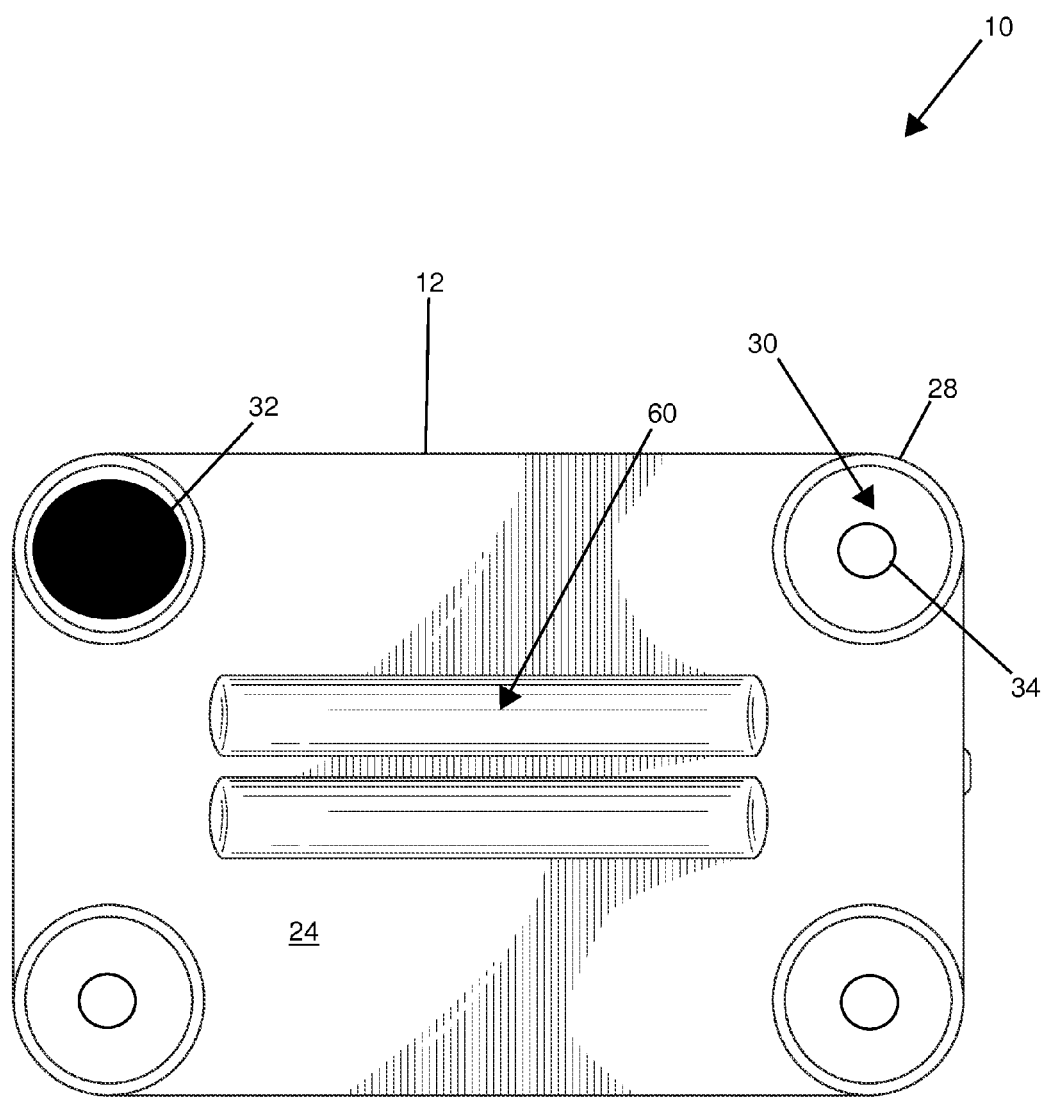
FIG. 4 of the drawings is a bottom plan view of the clamp assembly of FIG. 1.

Referring now to FIGS. 2-4 collectively, according to some embodiments, base member 12 includes bottom surface 24 and top surface 26. It will be understood that either one or both of bottom and top surfaces 24 and 26, respectively, are configured to mount to a plurality of substrates, including, but not limited to, a generally vertical and/or horizontal wall of a building, vehicle, boat, etcetera. For example, bottom surface 24 may include one or more continuous sidewalls 28 that define cavities 30 for containing magnets 32 (See FIG. 4). The magnets may be associable with, for example, a vehicle, boat, cabinet, wall, etcetera. Moreover base member 12 may include double sided sticky tape (not shown) and/or include apertures 34 for receiving fasteners, which are fixedly or releasably associable with substrate 18. It will be understood that combinations of the foregoing associations are likewise contemplated for use in accordance with the present invention.

In some embodiments, top surface 26 of base member 12 may also include two sidewalls 36 that extend normally from top surface 26. Sidewalls 36 are spaced apart from one another to define slot 38, which may be sized to receive at least a portion of first and second support members 14 and 16.

First support member 14 may be generally described as an arm which includes inner surface 40 and outer surface 42. First support member 14 is shaped to have first notch 44 and second notch 46. It will be understood that in some embodiments, notches 44 and 46 may be substantially arcuate in shape and furthermore where second notch 46 has a radius that is larger than the radius of first notch 44. In additional embodiments, the radius of first notch 44 may be larger than the radius of second notch 46. Moreover, rather than being arcuate, the shape of first and second notches 44 and 46 may be rectangular, triangular, arbitrary, and the like. Having notches 44 and 46 of differing sizes allows objects of varying sizes to be secured in place by clamp assembly 10. Additionally, in some embodiments, first and second support arms 14 and 16 may include a greater or fewer number of notches. Moreover, rather than being mirror images of one another, first and second support arms 14 and 16 may have notches that are offset from one another.

As is best shown in FIG. 1, first support member 14 is preferably displaceable along a generally latitudinal, first axis (X). It will be understood that in some embodiments, second support member 16 may be fabricated as a mirror image of first support member 14, and is also bilaterally displaceable along the same first axis. First and second support members 14 and 16, respectively, cooperate to form securement claws 48, which hold, for example at least a portion of a gun, a fishing rod, lawn/garden equipment, bottles, etcetera.

In some embodiments, each support member 14 and 16 may be inwardly biased by compression spring 50 (See FIG. 3) disposed within slot 38 that contacts top surface 26 and at least a portion of first and second support members 14 and 16. Additionally, each support member 14 and 16 may be pivotally connected to sidewalls 36 via pins 52. Pins 52 and compression springs 50 facilitate a natively closed position whereby first and second support members 14 and 16 contact each other at contact point 54. Additionally, when objects are inserted between first and second support members 14 and 16, compression spring 50 causes first and second support members 14 and 16 to exert compressive forces on the object inserted therebetween to hold the same in place. However, as is best shown in FIG. 2, clamp assembly 10 is also capable of being biased in an open position.

Moreover, in some embodiments, first and second support members 14 and 16 are provided with rounded ends 56 that help guide objects towards the space between first and second support members 14 and 16.

Lastly, as is best shown in FIGS. 2 and 4, clamp assembly 10 also preferably comprises one or more ribs 60, for strength and/or aesthetic purposes. Ribs 60 are preferably associated with base member 12, first support member 14, and/or second support member 16—along their top and/or bottom respective surfaces.

In operation, clamp assembly 10 is positioned on substrate 18. If clamp assembly 10 is attached to substrate 18 via one or more fasteners that extend through apertures 34 in base member 12, one fastener, such as a screw is placed through each aperture 34 and tightened until base member 12 is secured to substrate 18. It will be understood that in some embodiments, before fastening clamp assembly 10 to substrate 18, an adhesive may be disposed in one or more of the cavities or along a portion of bottom surface 24 of base member 12.

Once clamp assembly 10 has been secured to substrate 18, at least a portion of an object may be inserted between first and second support members 14 and 16 such that first and second support members 14 and 16 exert compressive forces onto the object to hold the same in place.

The foregoing description merely explains and illustrates the invention and the invention is not limited thereto except insofar as the appended claims are so limited, as those skilled in the art who have the disclosure before them will be able to make modifications without departing from the scope of the invention.

What is claimed and desired to be secured by Letters Patent of the United States is:

1. A clamp assembly, comprising:
    a base member, wherein the base member comprises a top surface and a bottom surface, and wherein at least one of the top and bottom surfaces is adapted for fixed or releasable association with a substrate,
    a first support arm, wherein the first support arm comprises an inner surface and an outer surface, and wherein the first support arm is displaceable along a first axis (X),
    a second support arm, wherein the second support arm comprises an inner surface and an outer surface, and wherein the second support arm is displaceable along the same first axis (X) as the first support arm,
    wherein the first and second support arms are biased such that the inner surfaces of the first and second support arms contact each other at a first contact point,
    wherein two sidewalls extend perpendicularly from the top surface of the base member, wherein the two sidewalls are spaced apart from one another to define a slot that is sized to receive at least a portion of each of the first and second support arms therein, and further wherein the first support arm and the second support arm each contact the two sidewalls,
    wherein each of the first and second support arms are pivotally connected to the sidewalls, and
    a first compression spring which contacts the first support arm and a second compression spring which contacts the second support arm, wherein the first and second compression springs bias the first and second support arms inwardly towards one another, and wherein the first and second compression springs contact the top surface of the base member.

2. The clamp assembly according to claim 1, wherein the first and second support arms each include a first notch and a second notch.

3. The clamp assembly according to claim 2, wherein the second notch is substantially arcuate in shape and has a radius larger than a radius of the first notch which is also substantially arcuate in shape.

4. The clamp assembly according to claim 1, wherein the first and second compression springs are disposed at least partially within the slot, and further wherein the first and second compression springs each include a length which is perpendicular to the top surface of the base member.

5. The clamp assembly according to claim 1, wherein the base member, the first support arm, and the second support arm each comprise at least one support rib.

6. A clamp assembly, comprising:
    a base member, wherein the base member comprises a top surface and a bottom surface, and wherein at least one of the top and bottom surfaces is adapted for fixed or releasable association with a substrate and at least one continuous sidewall extending from the bottom surface to define a cavity for receiving an adhesive product,
    a first support arm, wherein the first support arm comprises an inner surface and an outer surface, and wherein the first support arm is displaceable along a first axis (X) and pivotally connected to the base member,
    a second support arm, wherein the second support arm comprises an inner surface and an outer surface, and wherein the second support arm is displaceable along the same first axis (X) as the first support arm and pivotally connected to the base member,
    wherein the first and second support arms are biased such that the inner surfaces of the first and second support arms contact each other at a first contact point,
    wherein two sidewalls extend perpendicularly from the top surface of the base member, wherein the two sidewalls are spaced apart from one another to define a slot that is sized to receive at least a portion of each of the first and second support arms therein, and wherein the first support arm and the second support arm each contact the two sidewalls,
    wherein each one of the first and second support arms are pivotally connected to at least one of the two sidewalls via a pin, and
    a first compression spring which contacts the first support arm and a second compression spring which contacts the second support arm, wherein the first and second compression springs bias the first and second support arms inwardly towards one another, and wherein each compression spring contacts the top surface of the base member.

7. The clamp assembly according to claim 6, wherein the first and second support arms each include a first notch and a second notch.

8. The clamp assembly according to claim 7, wherein the second notch is substantially arcuate in shape and has a radius larger than a radius of the first notch which is also substantially arcuate in shape.

9. The clamp assembly according to claim 6, wherein each compression spring is disposed at least partially within the slot, and further wherein each compression spring includes a length which is perpendicular to the top surface of the base member.

* * * * *